United States Patent
Yang et al.

(10) Patent No.: US 11,838,488 B2
(45) Date of Patent: Dec. 5, 2023

(54) METHOD AND APPARATUS FOR PROVIDING CONVERSATIONAL SERVICES IN MOBILE COMMUNICATION SYSTEM

(71) Applicant: SAMSUNG ELECTRONICS CO., LTD., Suwon-si (KR)

(72) Inventors: Hyunkoo Yang, Suwon-si (KR); Jaeyeon Song, Suwon-si (KR); Eric Yip, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/657,076

(22) Filed: Mar. 29, 2022

(65) Prior Publication Data

US 2022/0321861 A1    Oct. 6, 2022

(30) Foreign Application Priority Data

Mar. 30, 2021    (KR) .......................... 10-2021-0041203

(51) Int. Cl.
*H04N 13/194*    (2018.01)
*H04L 65/60*    (2022.01)

(52) U.S. Cl.
CPC ........... *H04N 13/194* (2018.05); *H04L 65/60* (2013.01)

(58) Field of Classification Search
CPC ............. H04L 65/1104; H04L 65/1069; H04L 12/1822; H04L 65/60; H04N 21/816
See application file for complete search history.

(56) References Cited

U.S. PATENT DOCUMENTS

| 8,949,466 B1* | 2/2015 | Crosbie ............... H03M 7/6088 |
| | | 709/247 |
| 9,516,268 B2* | 12/2016 | Heda .................... H04L 12/1822 |
| 2004/0068583 A1* | 4/2004 | Monroe .............. H04L 67/5651 |
| | | 709/246 |
| 2006/0007230 A1 | 1/2006 | Hall et al. |
| 2008/0270618 A1* | 10/2008 | Rosenberg .......... H04L 65/1104 |
| | | 709/228 |

(Continued)

FOREIGN PATENT DOCUMENTS

| KR | 10-2022-0046356 A | 4/2022 |
| WO | 2020234373 A1 | 11/2020 |

OTHER PUBLICATIONS

Gul et al. "Cloud rendering-based volumetric video streaming system for mixed reality services." In Proceedings of the 11th ACM Multimedia Systems Conference (MMSys '20). Association for Computing Machinery, New York, NY, USA, 357-360. (Year: 2020).*

(Continued)

*Primary Examiner* — David R Lazaro

(57) ABSTRACT

Disclosed are a method and an apparatus for transmitting and receiving a volumetric video for a volumetric video communication service in a mobile communication system. The method includes: determining a volumetric video compression scheme for the volumetric video; transmitting a first message including first media parameters for the determined volumetric video compression scheme to a peer device; receiving a second message including second media parameters from the peer device in response to the transmission of the first message; and transmitting a volumetric video compressed according to the second media parameters to the peer device.

16 Claims, 8 Drawing Sheets

(56) References Cited

U.S. PATENT DOCUMENTS

| | | | | |
|---|---|---|---|---|
| 2010/0011012 A1* | 1/2010 | Rawson | ............... | H04L 67/30 |
| | | | | 707/E17.009 |
| 2011/0096699 A1* | 4/2011 | Sakhamuri | ............ | H04L 65/403 |
| | | | | 370/260 |
| 2011/0200094 A1* | 8/2011 | Kalra | ............... | H04L 69/24 |
| | | | | 375/E7.026 |
| 2013/0128947 A1* | 5/2013 | Fryer | ............... | H04N 21/2402 |
| | | | | 375/E7.026 |
| 2014/0080547 A1 | 3/2014 | Jung | | |
| 2017/0163607 A1* | 6/2017 | Skuratovich | ........ | H04L 65/1046 |
| 2018/0091791 A1 | 3/2018 | Jiang et al. | | |
| 2020/0145687 A1* | 5/2020 | Doidge | ............... | H04N 21/422 |
| 2020/0413157 A1* | 12/2020 | Rothschild | ....... | H04N 21/21805 |
| 2021/0006833 A1 | 1/2021 | Tourapis et al. | | |
| 2021/0021664 A1* | 1/2021 | Oyman | ............... | H04N 19/597 |
| 2021/0092347 A1 | 3/2021 | Han et al. | | |
| 2022/0217400 A1* | 7/2022 | Schwarz | ............... | H04N 19/46 |
| 2022/0321861 A1* | 10/2022 | Yang | ............... | H04L 65/60 |

OTHER PUBLICATIONS

Rosenberg et al. "RFC 3264 An Offer/Answer Model Session Description Protocol" Jun. 2002 (Year: 2002).*

Handley et al. "RFC 2327 SDP: Session Description Protocol" Apr. 1998 (Year: 1998).*

International Search Report and Written Opinion of the International Searching Authority in connection with International Application No. PCT/KR2022/003760 dated Jun. 14, 2022, 9 pages.

Supplementary European Search Report dated Sep. 28, 2023, in connection with European Patent Application No. 22781447.2, 6 pages.

* cited by examiner

METHOD AND APPARATUS FOR PROVIDING CONVERSATIONAL SERVICES IN MOBILE COMMUNICATION SYSTEM

CROSS-REFERENCE TO RELATED APPLICATION

This application is based on and claims priority under 35 U.S.C. 119 to Korean Patent Application No. 10-2021-0041203 filed on Mar. 30, 2021, in the Korean Intellectual Property Office, the disclosure of which is herein incorporated by reference in its entirety.

BACKGROUND

1. Field

Various embodiments relate to a method and an apparatus for providing a video conversation service using media content.

2. Description of Related Art

Augmented reality (AR) is a technology that superimposes a three-dimensional (or two-dimensional) virtual image on a real image or background and displays in a single image. Augmented reality technology that mixes real objects and virtual objects enables users to view objects in the real environment, thereby providing better realism and additional information.

In line with the development of communication technology, demand for providing various devices and extended reality (XR) services is increasing. "XR" may include virtual reality (VR), augmented reality (AR), or mixed reality (MR). XR services may include, for example, XR calls based on location-based service applications and three-dimensional (3D) XR objects, XR streaming, etc. XR calls indicate a service in which a function of producing and reproducing 3D objects is added to general video and voice calls, and XR streaming indicates a service in which an XR device receives XR content from a server and reproduces the same.

SUMMARY

"AR" is a technology that supplements the real world by outputting objects, which do not actually exist, to overlap the real world viewed by the eyes of the user. The object may be produced, stored, and transmitted in the form of a volumetric video. The volumetric video may utilize a higher computation capability and more network resources than a general video. Devices that process AR videos may have various form factors, such as a light glasses-type, a goggle-type, and a device equipped with a separate external computing device, and have different computation capabilities depending on the form factor.

Embodiments of the disclosure may provide a method and an apparatus for an AR communication service between devices having different computation capabilities.

Embodiments of the disclosure may provide a method and an apparatus for dynamically controlling the quality of an AR video depending on a network situation.

Embodiments of the disclosure may provide a method and an apparatus for negotiating a compression technology for 3D videos with a peer device in providing a conversation service using augmented reality (AR) content.

Embodiments of the disclosure may provide a method and an apparatus for configuring a 2D conversion compression scheme and parameters for scene change when compressing 3D videos and negotiating the compression scheme with a peer device.

A method for transmitting a volumetric video for a volumetric video communication service in a mobile communication system according to an embodiment may include: determining a volumetric video compression scheme for the volumetric video; transmitting a first message including first media parameters for the determined volumetric video compression scheme to a peer device; receiving a second message including second media parameters from the peer device in response to the transmission of the first message; and transmitting a volumetric video compressed according to the second media parameters to the peer device.

A method for receiving a volumetric video for a volumetric video communication service in a mobile communication system according to an embodiment may include: receiving a first message including first media parameters for a video compression scheme of the volumetric video from a peer device; transmitting a second message including second media parameters to the peer device in response to the reception of the first message; and receiving a volumetric video compressed according to the second media parameters from the peer device.

An apparatus of a user equipment for transmitting a volumetric video for a volumetric video communication service in a mobile communication system according to an embodiment may include a transceiver and a controller functionally connected to the transceiver, wherein the controller may be configured to determine a volumetric video compression scheme for the volumetric video, transmit a first message including first media parameters for the determined volumetric video compression scheme to a peer device, receive a second message including second media parameters from the peer device in response to the transmission of the first message, and transmit a volumetric video compressed according to the second media parameters to the peer device.

An apparatus of a user equipment for receiving a volumetric video for a volumetric video communication service in a mobile communication system according to an embodiment may include a transceiver and a controller functionally connected to the transceiver, wherein the controller may be configured to receive a first message including first media parameters for a video compression scheme of the volumetric video from the peer device, transmit a second message including second media parameters to the peer device in response to the reception of the first message, and receive a volumetric video compressed according to the second media parameters from the peer device.

According to the disclosed embodiments, an excellent AR communication service is provided through negotiation of media parameters between terminals having different computation capabilities.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

Figure 1:
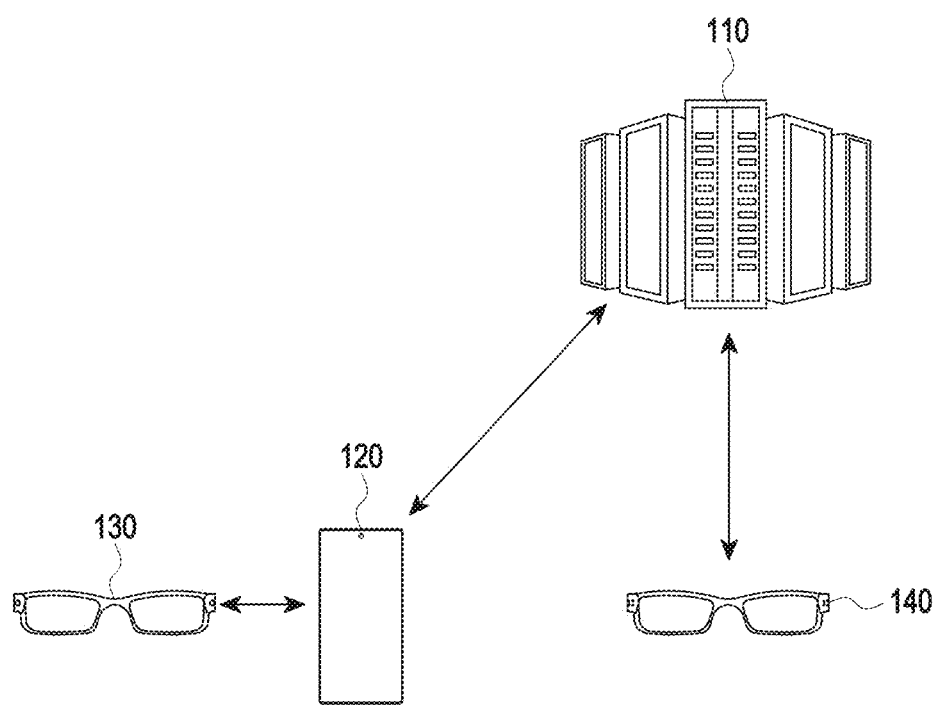
FIG. 1 illustrates augmented reality devices and a server according to various embodiments.

FIG. 1 illustrates augmented reality devices and a server according to various embodiments.

Referring to FIG. 1, an augmented reality device 130 and an augmented reality device 140 may be electronic devices owned by conference participants who are participating in the same conference. According to various embodiments, at least one of the augmented reality device 130 and the augmented reality device 140 may display media content shared in the conference. A server 110 may control communication between a plurality of augmented reality devices 130 and 140 and connect the same.

According to various embodiments, the server 110 may directly communicate with the augmented reality device 140. According to various embodiments, the server 110 may communicate with the electronic device 120 that interacts with the augmented reality device 130. According to various embodiments, the electronic device 120 may perform at least one operation to determine content to be displayed on the augmented reality device 130. According to various embodiments, the server 110 may control information utilized (for example, necessary information) for communication of the augmented reality device 130 or receive management through the electronic device 120.

According to various embodiments, the augmented reality device 130 may transmit data including media content to be used in a conference to the augmented reality device 140, and the augmented reality device 140 may output (e.g., display) the media included in the received data. According to various embodiments, the augmented reality device 140 may display the media content and, at the same time, further display personal content of the augmented reality device 140, which is not shared between conference members. According to various embodiments, the server 110 may transmit data including media content to be used in a conference to the augmented reality device 130 or the augmented reality device 140 through the electronic device 120.

Although the embodiments mentioned in the disclosure will be described in connection with operations performed by the augmented reality device 130 or 140, the augmented reality device 130 may exchange information with the server 110 through the electronic device 120, and in this case, at least some of the operations included in the embodiments to be described below may be performed by the electronic device 120 or the server 110, as shown in FIG. 1.

In an embodiment, the key content in XR, including VR and AR, may be volumetric videos. Objects or spaces may be captured in real time and recorded into videos in three dimensions. Volumetric video may include continuous volumetric frames that change with time. Each volumetric frame may be represented as a set of points existing in a three-dimensional space at a specific time, and the points may have various attributes such as color and reflectance. The volumetric frame may be stored and transmitted in the form of 3D model media having different structures depending on the characteristics and applications of the content. In embodiments of the disclosure, an element-based 3D model structure and a scene-based 3D model media structure may be considered as the structures of the 3D model media.

Figure 2:
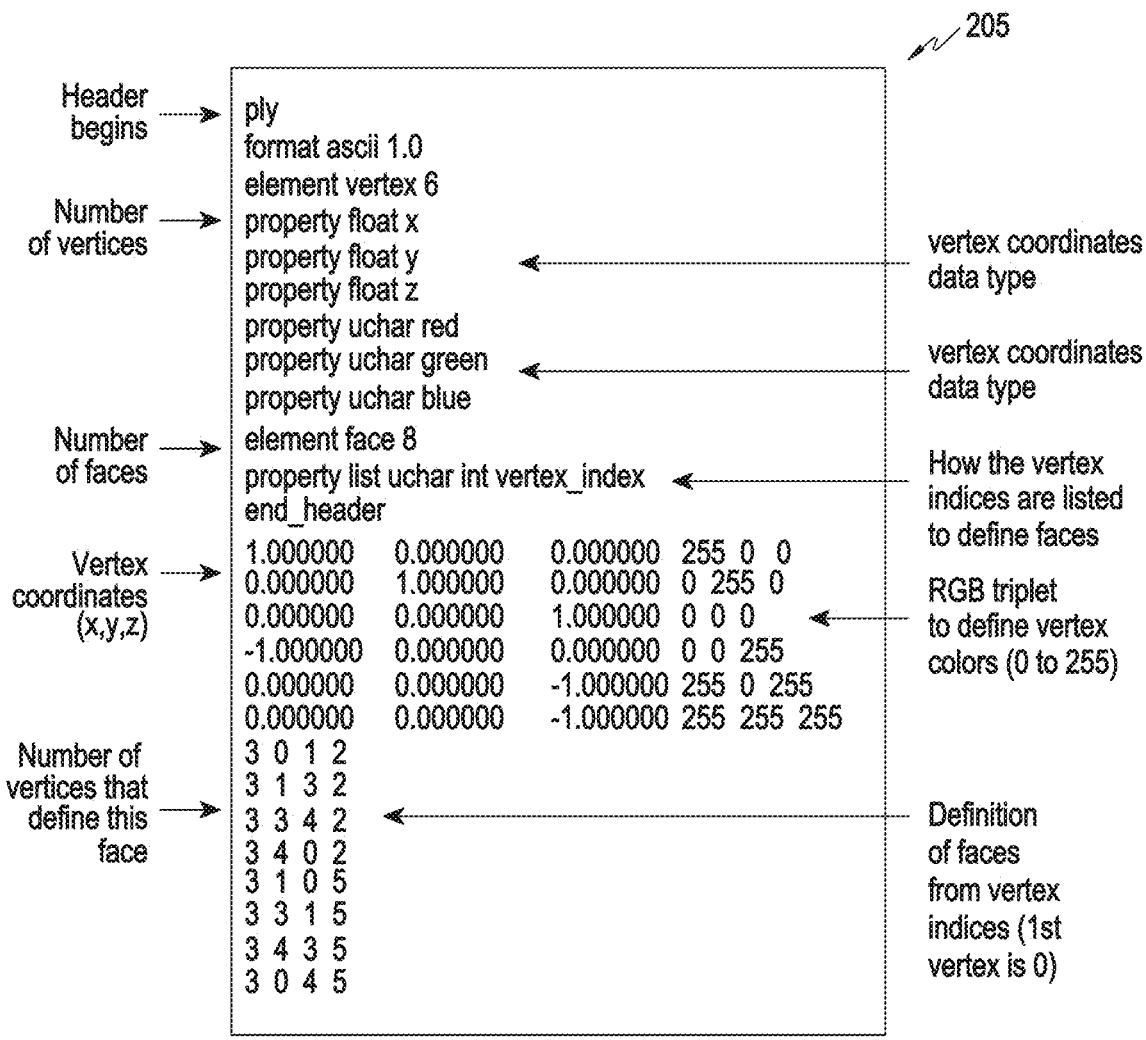
FIG. 2 illustrates an element-based 3D model media structure.

FIG. 2 illustrates an element-based 3D model media structure. Here, the polygon (PLY) file format 205 (e.g., a PLY file), which is an example of the element-based 3D model media, is illustrated.

Referring to FIG. 2, the PLY file format 205 may regard an object (e.g., a media object) existing in a three-dimensional space as a point cloud representing a set of vertices, and may express and store the object in three dimensions using elements representing the attributes of the vertices (which may include, for example, coordinates and/or colors). A vertex indicates a point in a volumetric space, and location information may be represented in terms of three axes in a coordinate system. One vertex may have one or more attributes. The PLY file format 205 may further include elements that provide information about an edge or a face including the points. The edge may indicate a line between two vertices. For example, a face may be a triangle or a rectangle formed by three or four vertices.

Figure 3:
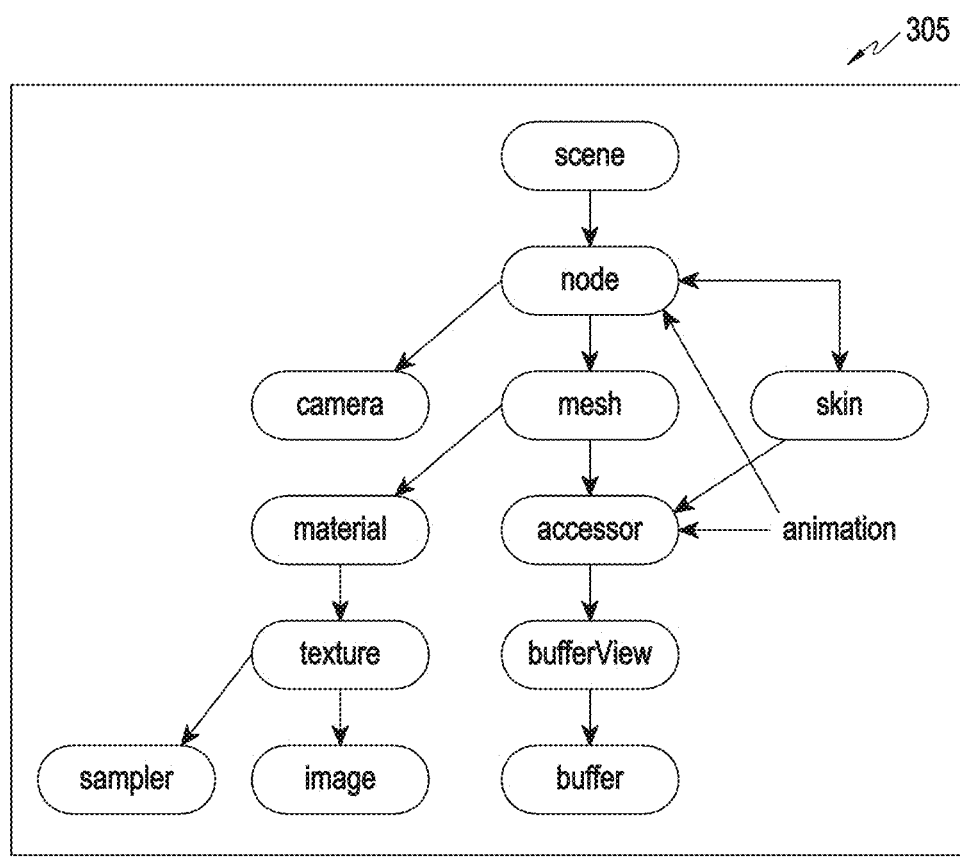
FIG. 3 illustrates a scene-based 3D model media structure.

FIG. 3 illustrates a scene-based 3D model media structure. Here, a graphics language transmission format (gltf) format 305 (e.g., a gltf file), which is an example of the scene-based 3D model media, is illustrated.

Referring to FIG. 3, the gltf format 305 may represent a scene in a three-dimensional space by spatially and logically structuring the same. More specifically, the scene may be structured as a plurality of nodes (e.g., camera nodes, mesh nodes, skin nodes, material nodes, accessor nodes, texture nodes, bufferView nodes, sampler nodes, video nodes, and/or buffer nodes) having a tree or graph structure and may be represented in the JavaScript object notation (JSON) format. Actual media data referenced by each node may be described as the above-described element-based 3D model structure (e.g., PLY file format 205).

The two-dimensional vector value referenced by the <mesh> node may be related to the value of the <buffer> node. For example, the <buffer> node may have a byte unit value of "35", which may indicate 35 bytes of buffer data. The <bufferView> node may define a segment of buffer data specified by the <buffer> node as byteOffset=4 and ByteLength=28, which may indicate buffer data of 4 to 32 bytes. The <accessor> node may include byteOffset=4 as an additional offset, which may indicate buffer data of 8 to 32 bytes. As another example, the <bufferView> node may specify a stride between the elements in buffer data as byteStride=12, which may indicate a byte-distance of 8 to 16 and a byte-distance of 20 to 28. The <accessor> node may include type="VEC2" and componentType=GL_FLOAT to define that the elements are two-dimensional plot vectors.

In an embodiment, the size of the buffer depends on the number of vertices, edges, and faces representing the 3D object, and thus, when capturing and 3D-modeling a real object, the size of the buffer is an important factor in determining the quality of the 3D model.

The gltf format 305 may provide an animation function in the form of transforming a specific node in a predetermined direction. For example, a human arm may be modeled as a tree including three nodes representing a hand, a forearm, and an upper arm, respectively, and the animation effect of moving the hand upwards may be implemented by moving both the forearm and upper arm using a connection relationship between the three nodes.

The diversity of the 3D model described above makes it possible for the 3D model including volumetric frames constituting the volumetric video and information corresponding to the volumetric frames to have various correlations.

Figure 4:
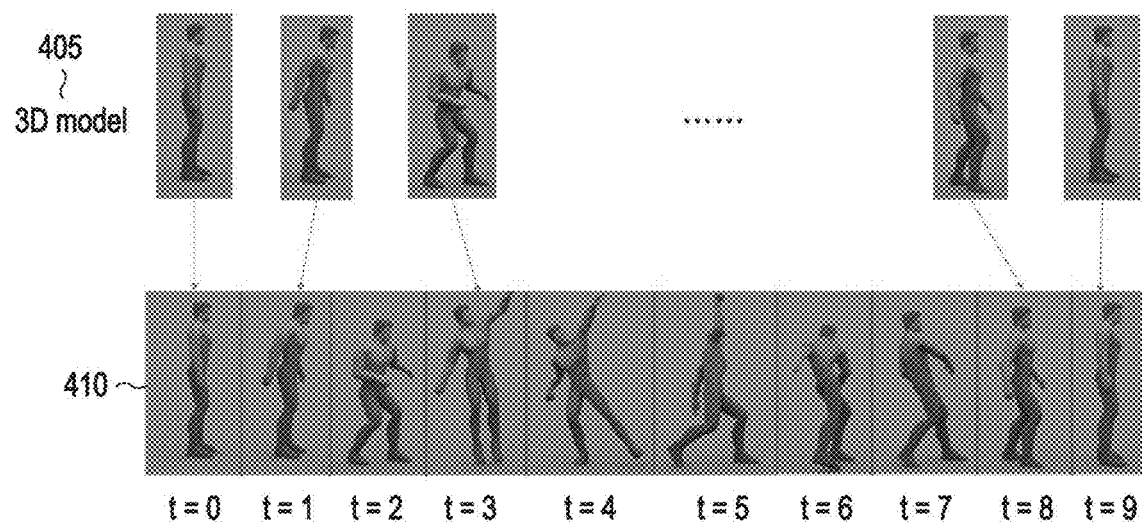
FIG. 4 illustrates a volumetric video configured as continuous 3D models.

FIG. 4 illustrates a volumetric video configured as continuous 3D models.

Referring to FIG. 4, a volumetric video 405 configured as continuous 3D models may include 10 volumetric frames 410, and each volumetric frame 410 may be related to one 3D model (e.g., the element-based 3D model in FIG. 2 or the scene-based 3D model in FIG. 3).

Figure 5:
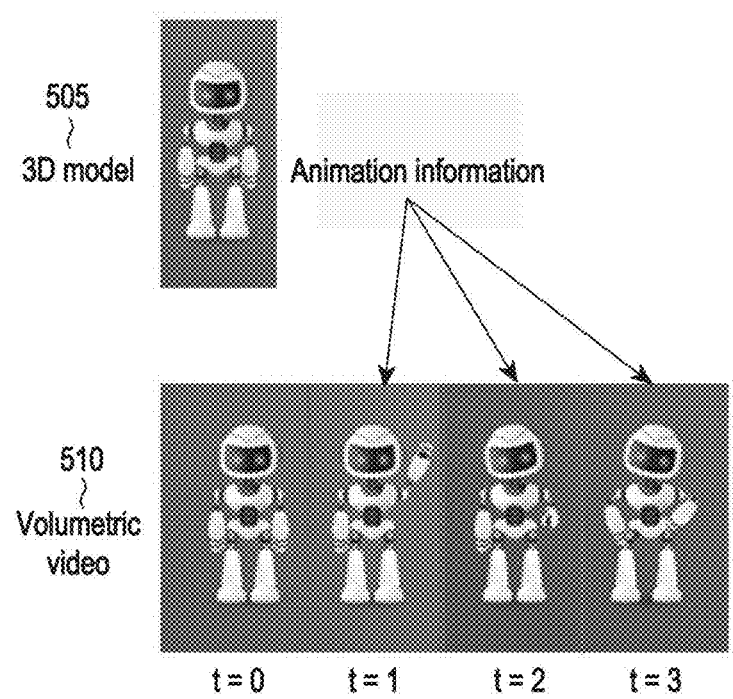
FIG. 5 illustrates an animation-based volumetric video.

FIG. 5 illustrates an animation-based volumetric video.

Referring to FIG. 5, a volumetric video 505 configured as animation-based 3D models may include four volumetric frames 510, and all of the four volumetric frames 510 may be related to one 3D model (e.g., the element-based 3D model in FIG. 2 or the scene-based 3D model in FIG. 3) including animation information.

Figure 6:
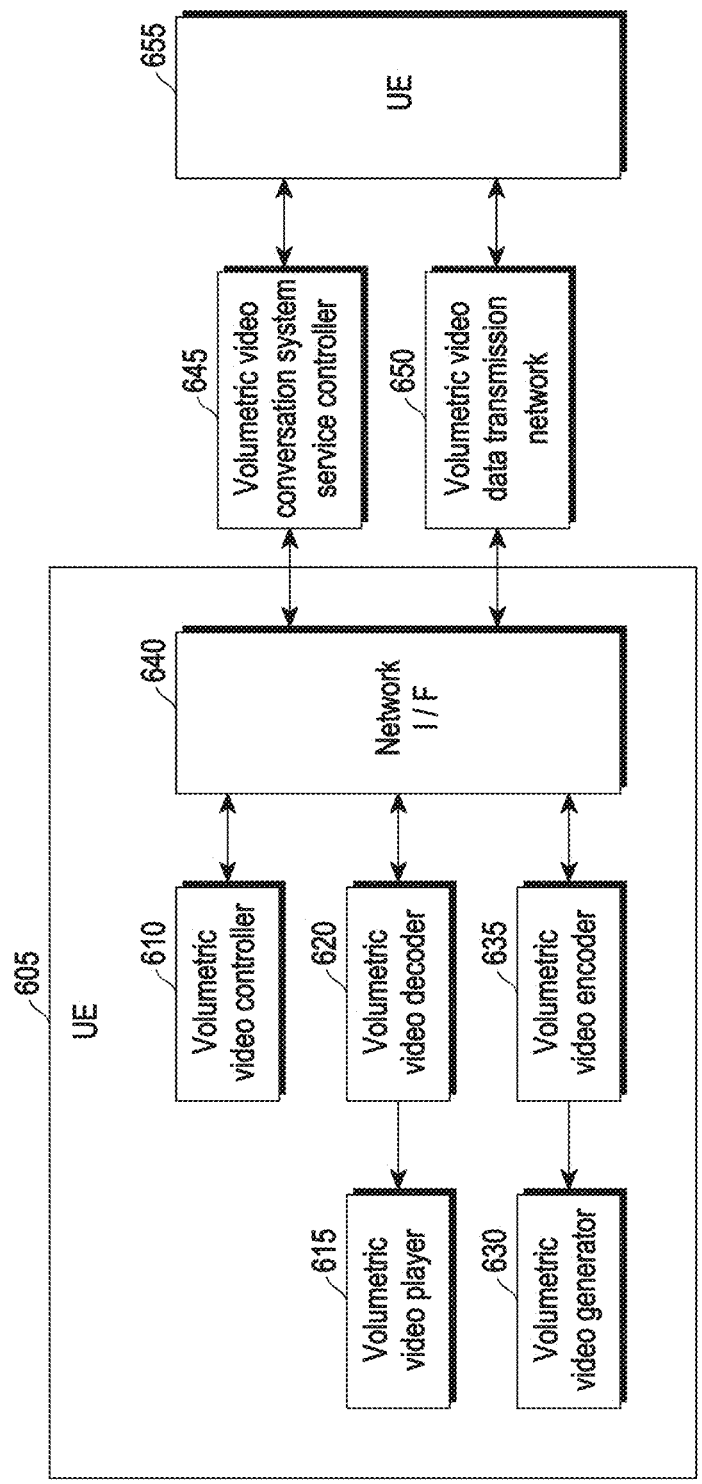
FIG. 6 illustrates a volumetric video conversation system according to various embodiments.

FIG. 6 illustrates a volumetric video conversation system according to various embodiments.

Referring to FIG. 6, a volumetric video conversation system may include two or more user equipments (UEs) 605 and 655 (also referred to as caller 605 and callee 655, respectively), a service controller 645, and a transmission network 650. For example, the user equipment 605 among the user equipments 605 and 655 may include, for example, at least one of a network interface (I/F) 640, a volumetric video controller 610, a volumetric video decoder 620, a volumetric video encoder 635, a volumetric video player 615, or a volumetric video generator 630. Here, the network interface (I/F) 640 may operate as a transceiver. At least one of the volumetric video controller 610, the volumetric video decoder 620, the volumetric video encoder 635, the volumetric video player 615, and the volumetric video generator 630 may be included in the controller.

The transmission network 650 may include a media transmission path for carrying volumetric media data for volumetric video conversation between the user equipments 605 and 655, and the service controller 645 may perform a series of operations necessary for exchanging actual media data for the volumetric video conversation through the media transmission path.

The operations performed by the volumetric video conversation service controller 645 may include recognition of a network address of a peer user equipment (e.g., the user equipment 655) and negotiation of media parameters for volumetric video conversation. As an embodiment, if a 5G system provides an IP multimedia subsystem (IMS)-based volumetric video conversation service, the operations of the volumetric video conversation service controller 645 may be provided using session initiation protocol (SIP) and session description protocol (SDP). In an embodiment, media parameters for volumetric video conversation may be negotiated using SDP signaling and formats.

Figure 7:
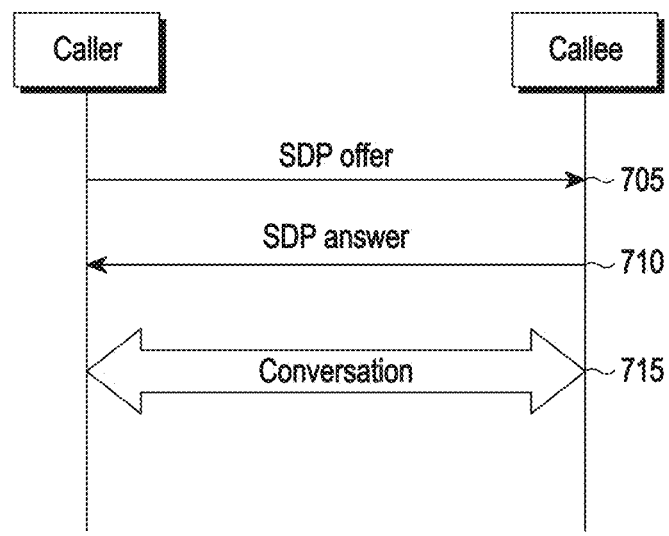
FIG. 7 illustrates a negotiation procedure for volumetric video conversation according to various embodiments.

FIG. 7 illustrates a negotiation procedure for volumetric video conversation according to various embodiments. Here, SDP messages between a user equipment (e.g., the user equipment 605) operating as a caller and a user equipment (e.g., the user equipment 655) operating as a callee are shown.

Referring to FIG. 7, in operation 705, the caller 605 transmits, to the callee 655, an SDP message including signaling information including media parameters for videos and audio to be transmitted/received using SDP. The SDP message may be, for example, "SDP offer". The media parameters may include at least one piece of information on codec of volumetric media data and a video resolution, and may include a plurality of pieces of configuration information about one medium.

In operation 710, the callee 655 determines at least one piece of configuration information to be finally used in consideration of the processing capability of the callee 655, based on a plurality of pieces of configuration information included in the media parameters received through the SDP offer message, and transmits the determined configuration information to the caller 605 using an SDP message. The SDP message may be "SDP answer". The SDP answer message may include configuration information, which is not included in the SDP offer.

In operation 715, if the caller 605 agrees to the configuration information received through the SDP answer message, the caller 605 may initiate a call. Although not shown, if the caller 605 does not agree to the configuration information received through the ADP answer message, the caller 605 may perform operations 705 and 710 again to modify the configuration information included in the SDP answer message and to perform renegotiation.

In an embodiment, if the caller 605 or the callee 655 needs to change at least one media parameter during the call in operation 715, the caller 605 or the callee 655 may perform renegotiation including operations 705 and 710 or exchange new configuration information using real-time transport control protocol (RTCP). In an embodiment, the media parameters affecting the processing capability of any one user equipment or the network capacity may be exchanged through SDP renegotiation. In an embodiment, the media parameters that do not affect the processing capability of any one user equipment or the network capacity or that are dynamically changeable may be exchanged using RTCP.

As described above, the volumetric video may have a different volumetric frame structure (e.g., FIG. 4 or 5) depending on the used 3D model (e.g., the model structures in FIG. 2 or FIG. 3), and a compression scheme of the volumetric video may be differently determined depending on the 3D model or frame structure.

In the case where the PLY file format (see FIG. 2), which is an example of the element-based 3D model structure, is used, the volumetric video may include a series of volumetric frames 410 each including PLY files as shown in FIG. 4. Since the volumetric frames 410 of the 3D model expressed as the PLY files have correlation on the time axis, video-based compression tools may be efficiently used.

Figure 8:
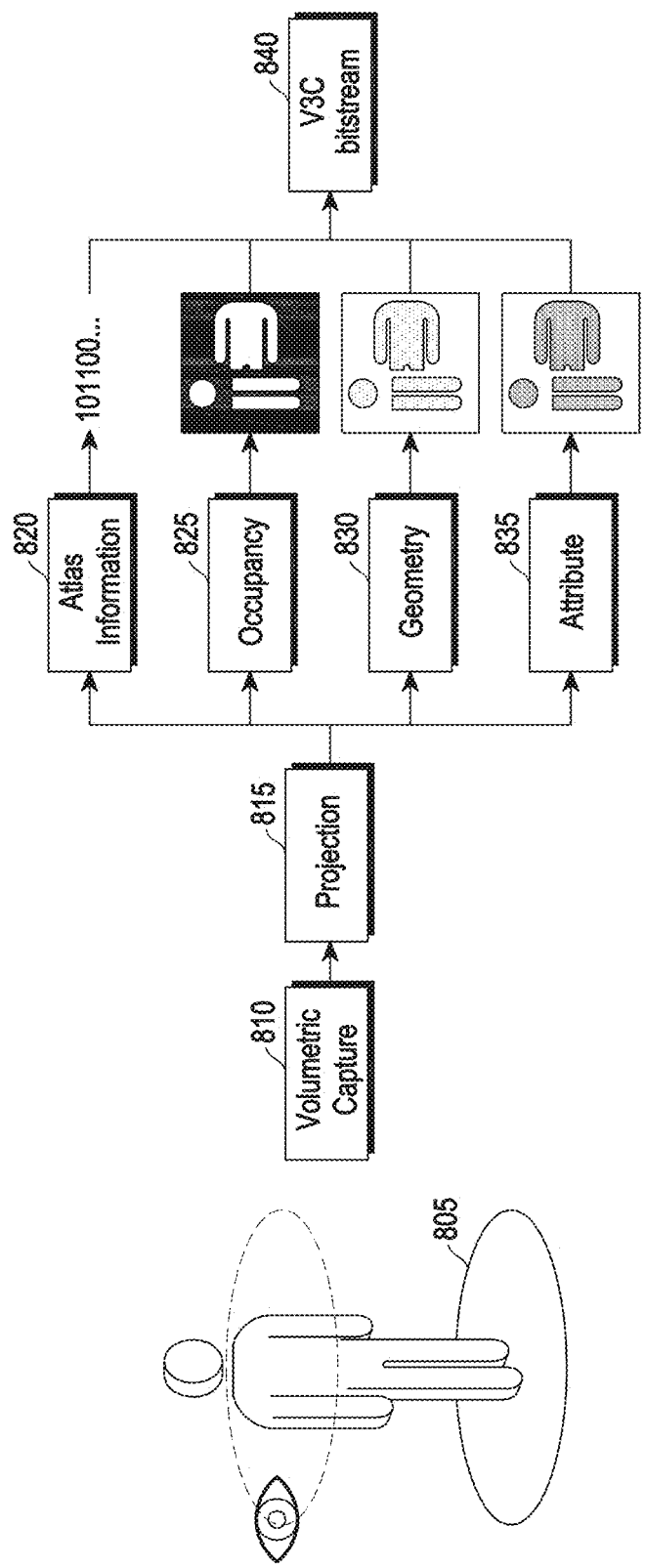
FIG. 8 illustrates video-based compression of a volumetric video according to various embodiments.

FIG. 8 illustrates video-based compression of a volumetric video according to various embodiments. Here, a volumetric video encoder (e.g., 635) that supports ISO/IEC 23090-5 visual volumetric video-based coding (V3C) and video-based point cloud compression (V-PCC) standards is shown as an example of video-based compression.

Referring to FIG. 8, a volumetric capture module 810 may produce 3D model data reflecting an actual object 805, a projection module 815 may divide the 3D model data into a plurality of (e.g., four) substreams through a projection process, the substreams may be respectively compressed by a plurality of (e.g., four) codecs 820, 825, 830, and 835, and a multiplexer 840 may multiplex the compressed substreams into a V3C bitstream for transmission. In an embodiment, each of the substreams may include atlas (Atl) data, occupancy (Occ) data, geometry (Geo) data, and attribute (Att) data. Here, substreams including occupancy, geometry, and attribute data may be compressed using, for example, a video codec such as high efficiency video coding (HEVC) or advanced video coding (AVC).

In the case where the scene-based 3D model structure is used, the volumetric video may have a structure in which the structures shown in FIGS. 4 and 5 are mixed. As an example of the scene-based 3D model, media data in the gltf format (e.g., FIG. 3) may include a JSON document indicating a scene structure and actual media data. In an embodiment, the volumetric video in FIG. 4 and the volumetric video in FIG. 5 may be implemented by updating the media data and updating the JSON document, respectively.

Figure 9:
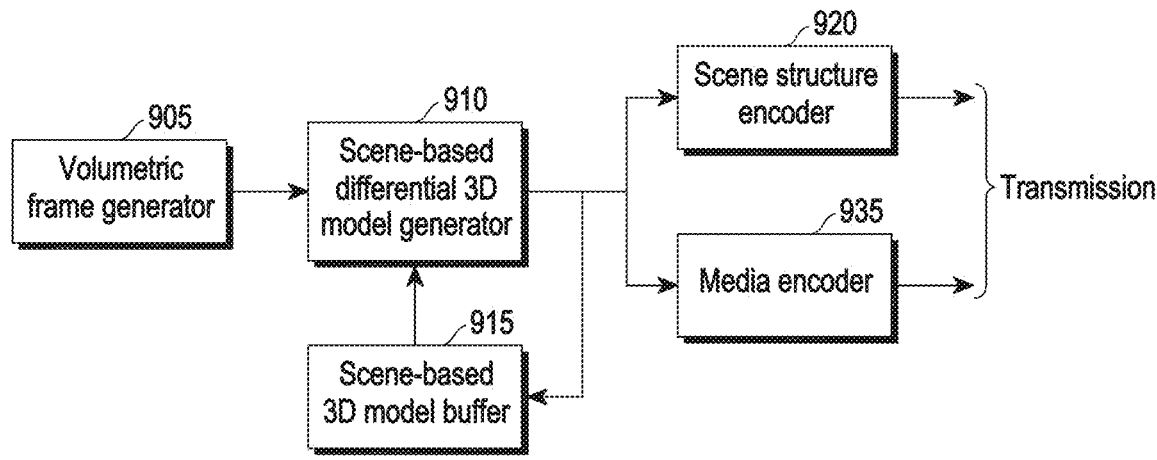
FIG. 9 illustrates scene-based compression of a volumetric video according to various embodiments.

FIG. 9 illustrates scene-based compression of a volumetric video according to various embodiments. A volumetric frame generator 905, a scene-based differential 3D model generator 910, a scene-based 3D model buffer 915, a scene structure encoder 920, and a media encoder 935 having the configurations shown in an embodiment may be included in the volumetric video encoder 635 in FIG. 6.

Referring to FIG. 9, the volumetric frame generator 905 may produce a series of volumetric frames. The scene-based differential 3D model generator 910 may produce a scene structure in the gltf format for each volumetric frame. For example, the scene structure may be given by a hierarchy between nodes constituting the 3D scene in order to describe the entire content of the 3D scene as shown in FIG. 3. The produced scene structure may be stored in the scene-based 3D model buffer 915 and may be input to the scene structure encoder 920. The scene structure encoder 920 may output differential data on the scene structure in the form of a JSON patch document. The media encoder 935 may output media data encoded using a given video encoding technique.

The conventional video encoder outputs temporally continuous encoded data as a result of processing an input signal. In contrast, in the scene-based compression according to an embodiment of the disclosure, an input signal (e.g., the volumetric frame) at a specific time may be processed by the scene structure encoder 920, the media encoder 935, or both the scene structure encoder 920 and the media encoder 935 and may be output for transmission. Accordingly, outputs of the scene structure encoder 920 and the media encoder 935 may be temporally discontinuous.

When the output data of the scene structure encoder 920 and the media encoder 935 is stored and transmitted in respective streams, the scene structure information (e.g., the JSON patch document containing differential data on the scene structure) output from the scene structure encoder 920 may include location information for obtaining the output data of the media encoder 935. For example, the location information may include at least one of a uniform resource locator (URL) of a file, a track identifier of an ISO base media file format (ISOBMFF), or information for accessing a streaming session. For example, the information for accessing a streaming session may include at least one of an IP address, a protocol identifier, or a port number, and may further include a protocol payload type depending on the protocol identifier.

Figure 10:
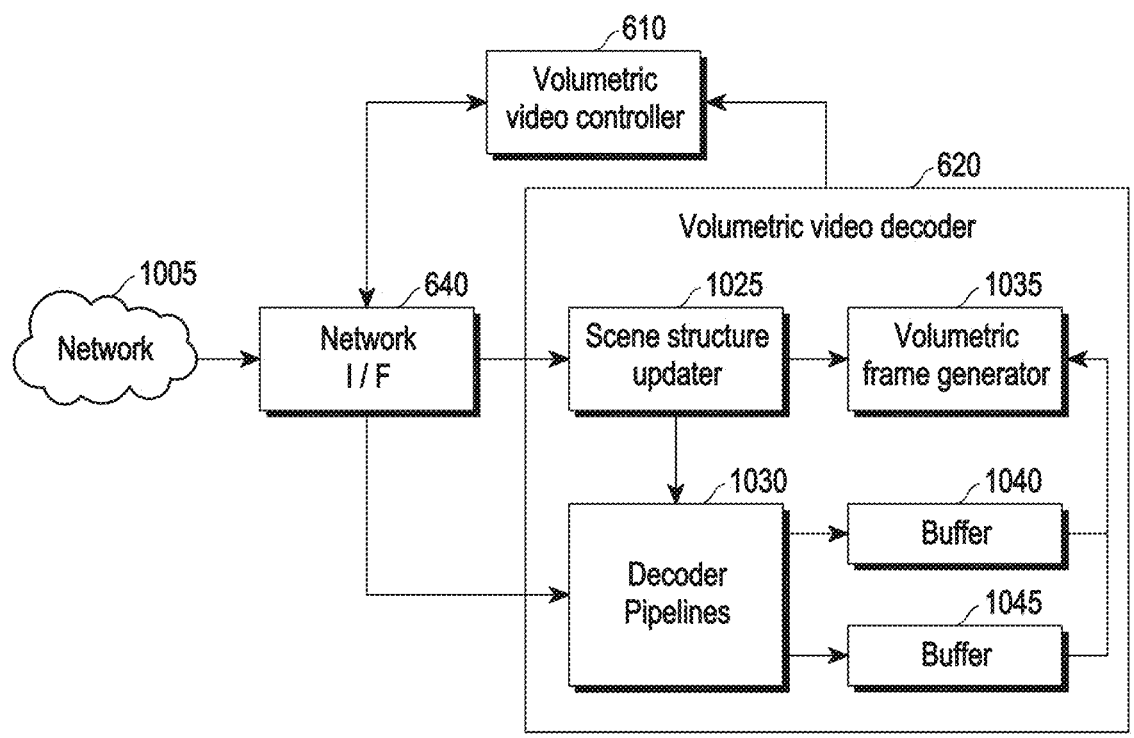
FIG. 10 illustrates a volumetric video decoder according to various embodiments.

FIG. 10 shows the structure of a volumetric video decoder according to various embodiments. In an embodiment, a scene structure updater 1025, a volumetric frame generator 1035, decoder pipelines 1030, and buffers 1040 and 1045 of the illustrated configurations may be included in the volumetric video decoder 625 in FIG. 6. The network interface 640 may transmit media data of a plurality of streams received through a network 1005 to the volumetric video decoder 625, and the volumetric video decoder 625 may decode the media data by the configuration to be described later.

Referring to FIG. 10, the scene structure updater 1025 may output an updated scene structure included in the data received through at least one of a plurality of streams. The decoder pipelines 1030 may include at least one media decoder for respectively decoding media data received through the plurality of streams. Each media decoder may output updated media data corresponding to each stream to a corresponding buffer 1040 or 1045. The volumetric frame generator 1035 may configure a volumetric frame using at least one of the updated scene structure and the updated media data input from the buffers 1040 and 1045.

In the volumetric video conversation system according to an embodiment, the user equipment 605 may negotiate media parameters with the peer user equipment 655 using SDP. In SDP, a session in which media data is transmitted may be described by a media(m)-line. An SDP message (e.g., the SDP offer message or the SDP answer message in FIG. 7) transmitted to negotiate media parameters for at least one session may include at least one m-line and information elements corresponding to an attribute(a)-line indicating attributes for describing the characteristics of media data transmitted in the corresponding session for each m-line.

In an embodiment, the m-line may have the following format.

m=<media> <port> <proto> <fmt> . . .

Here, the <media> field indicates a media type, and may have, for example, a value of "audio", "video", or "application".

The <port> field indicates a port through which a media stream is transmitted, and may have different meanings depending on a network and a transport protocol defined as <proto>.

The <proto> field may indicate transport protocol.

The <fmt> field may indicate a media format.

The volumetric video conversation system according to an embodiment may provide volumetric videos using a video-based compression technique. The volumetric video data may be transmitted in one or more sessions.

In an embodiment, in the case where the volumetric video data is transmitted in one session, the SDP message transmitted to negotiate configuration information of the session may be described, for example, as shown in Table 1 below.

TABLE 1 m=video 10000 RTP/AVPF 97 98
a=rtpmap:97 V3C
a=fmtp:97 CodecGroup1
a=rtpmap:98 V3C
a=fmtp:987 CodecGroup2

In the example of the SDP message, the m-line may include fields containing information for identifying the sessions of media data (e.g., media type=video, port number=1000, protocol=RTP/AVPF, and media format=97 and 98). The first and third attribute lines may indicate that the media data in media formats 97 and 98 transmitted to the session described as the m-line use real time protocol (RTP) connection and use a volumetric video compression scheme identified as V3C. The second and fourth attribute lines include CodecGroup1 and CodecGroup2, respectively, which indicate groups of media parameters to be used in the media formats identified as 97 and 98, respectively. The media parameters may include at least one of the type of codec, a profile, or a level used for media compression of a corresponding stream.

In an embodiment, in the case where the volumetric video data is transmitted in two or more sessions, an SDP message (e.g., the SDP offer message or SDP answer message in FIG. 7) transmitted to negotiate configuration information of the sessions may be described, for example, as shown in <Table 2> below.

TABLE 2 a=V3CGroup: Atl Occ Geo Att1 Att2
m=application 10000 TCP *
a=AtlParam
a=mid:Atl
m=video 10002 RTP/AVPF 97 98
a=rtpmap:97 HEVC
a=fmtp:97 profile-id=x; level-id=y;...
a=rtpmap:98 AVC
a=fmtp:98 profile-level-id=y;...
a=mid:Occ
m=video 10004 RTP/AVPF 99 100
a=rtpmap:99 HEVC
a=fmtp:99 profile-id=x; level-id=y;...
a=rtpmap:100 AVC
a=fmtp:100 profile-level-id=y;...
a=mid:Geo
m=video 10006 RTP/AVPF 101 102
a=rtpmap:101 HEVC
a=fmtp:101 profile-id=x; level-id=y;...
a=rtpmap:102 AVC
a=fmtp:102 profile-level-id=y;...
a=mid:Att1
m=video 10006 RTP/AVPF 103 104
a=rtpmap:103 HEVC
a=fmtp:103 profile-id=x; level-id=y;...
a=rtpmap:104 AVC
a=fmtp:104 profile-level-id=y;...
a=mid:Att2

In the example of the SDP message, the first a-line "a=V3CGroup: Atl Occ Geo Att1 Att2" indicates that substreams of media data using a volumetric video compression scheme identified as V3C are transmitted through media sessions having mid (media id) attribute values of Atl, Occ, Geo, Att1, and Att2, respectively. Here, "Atl" may indicate atlas information, "Occ" may indicate occupancy video data, "Geo" may indicate geometry video data, and "Att1" and "Att2" may indicate attribute video data. "a=AltParam" may include parameters specific to the atlas format and media parameters for describing the entirety of the V3C bitstream. The media parameters for describing the entirety of the V3C bitstream may include, for example, at least one of CodecGroup including codec parameters used in the respective substreams, information on the bandwidth of the entirety of grouped media sessions, a limited number (for example, the maximum number) of points included in the compressed 3D model, or identifiers indicating specified attributes. In certain embodiments, the specified attributes include essential attributes, but this disclosure does not require the specified attributes to include essential attributes.

In <Table 2>, "a=mid:Atl" may indicate that the media session described by the m-line in the next row carries Atl information. The m-line "m=video 10002 RTP/AVPF 97 98" may indicate that the media type of the media session is video, that the port number is 10002, that the protocol is RTP/AVPF, and that the media format is identified as 97 and 98. The a-lines after the m-line may include media parameters related to the media session. Descriptions of "a=mid:Occ", "a=mid:Geo", "a=mid:Att1", and lines related thereto are similar to the above.

The volumetric video conversation system according to an embodiment may provide volumetric videos using a scene-based compression technique. An SDP message for configuring sessions in which volumetric video data obtained through the scene-based compression technique is transmitted may include, for example, information elements shown in Table 3 below.

TABLE 3

```
a=SDGroup: SD M1 M2
m=application 10000 TCP *
a=SDParam
a=mid:SD
m=video 10002 RTP/AVPF 97 98
a=rtpmap:97 HEVC
a=fmtp:97 profile-id=x; level-id=y;...
a=rtpmap:98 AVC
a=fmtp:98 profile-level-id=y;...
a=mid:M1
m=video 10004 RTP/AVPF 99 100
a=rtpmap:99 HEVC
a=fmtp:99 profile-id=x; level-id=y;...
a=rtpmap:100 AVC
a=fmtp:100 profile-level-id=y;...
a=mid:M2
```

In the example of the SDP message, the first a-line "a=SDGroup: SD M1 M2" indicates that media data using a volumetric video compression scheme identified by scene description (SD) is transmitted through media sessions having mid attribute values of SD and M1, respectively. "a=SDParam" may include parameters specific to the SD format. The parameters specific to the SD format may include, for example, multipurpose internet mail extensions (MIME)-type parameters.

In <Table 3>, "a=mid:SD" may indicate that the media session described by the in-line in the next row carries media data in the SD format. The in-line "video 10002 RTP/AVPF 97 98" may indicate that the media type of the media session is video, that the port number is 10002, that the protocol is RTP/AVPF, and that media format is identified as 97 and 98. The a-lines after the m-line may include media parameters related to the media session. The descriptions of "a=mid: M1" and lines related thereto are similar to the above.

In the example of the SDP message, parameters M1 and M2 in "a=mid:M1" and "a=mid:M2" may be used as identifiers to refer to media streams transmitted through "m=video 10002 RTP/AVPF" and "m=video 10004 RTP/AVPF" in a 3D model having the SD format. In an embodiment, the identifiers of the media streams used in the 3D model are separate attribute values such as "a=label: media1" and "a=label: media2", which may be included in the SDP message.

In an embodiment, the above-described parameters may be included in an RTCP feedback message or a command of a hypertext transfer protocol (HTTP) restful application program interface (API) and may be transmitted during a call.

In an embodiment, the user equipment may transmit media data of a static 3D model to the peer user equipment using a data channel and negotiate media parameters to be used in transmission of a scene-based-compressed volumetric video using SDP re-invite. If the negotiation is successful, data produced based on the negotiated media parameters may be transmitted to the peer user equipment. In other words, the media data of the static 3D model is initially transmitted using a data channel, and media data transmission parameters for updating the 3D model may be transmitted to the peer user equipment through a data channel, or may be transmitted to the peer user equipment through a message including a separate m-line for negotiation. Depending on capabilities of the user equipment, embodiments of this disclosure enable the user equipment to use media data of the static 3D model and voice data while transmitting using the media data of the static 3D model, instead of performing the negotiation procedure using SDP re-invite.

A method for transmitting a volumetric video for a volumetric video communication service in a mobile communication system according to an embodiment may include: determining a volumetric video compression scheme for the volumetric video; transmitting a first message including first media parameters for the determined volumetric video compression scheme to a peer device; receiving a second message including second media parameters from the peer device in response to the transmission of the first message; and transmitting a volumetric video compressed according to the second media parameters to the peer device.

In an embodiment, at least one of the first or second messages may include first attribute line information indicating that media data of the volumetric video produced using the volumetric video compression scheme is transmitted through a plurality of media sessions, second attribute line information including media parameters describing the entirety of the plurality of media sessions, third attribute line information indicating a media attribute value of a first media session among the plurality of media sessions, first media line information describing a media type, a port number, protocol, and a media format of the first media session related to the third attribute line information, and at least one piece of fourth attribute line information including media parameters of the first media session related to the first media line information.

In an embodiment, the first attribute line information may indicate that the media data of the volumetric video is transmitted through the plurality of media sessions having media attribute values of atlas information, occupancy video data, geometry video data, and at least one piece of attribute video data, respectively.

In an embodiment, the second attribute line information may include at least one of a group of codec parameters used in substreams carried through the plurality of media sessions, information on a bandwidth of the entirety of grouped media sessions, a limited number (for example, the maximum number) of points included in the compressed three-dimensional (3D) model, or specified attributes.

In an embodiment, the first attribute line information may indicate that the media data of the volumetric video is produced using the volumetric video compression scheme identified as SD (scene description) and is transmitted through the plurality of media sessions having media attribute values of SD and M1, respectively, and the second attribute line information may include at least one media parameter specific to an SD format.

In an embodiment, at least one of the first or second messages may be an SDP offer message, an SDP answer message, an RTCP feedback message, or a command of HTTP restful API.

A method for receiving a volumetric video for a volumetric video communication service in a mobile communication system according to an embodiment may include: receiving a first message including first media parameters for a video compression scheme of the volumetric video from a peer device; transmitting a second message including second media parameters to the peer device in response to the reception of the first message; and receiving a volumetric video compressed according to the second media parameters from the peer device.

In an embodiment, at least one of the first or second messages may include first attribute line information indicating that media data of the volumetric video produced using the volumetric video compression scheme is transmitted through a plurality of media sessions, second attribute line information including media parameters describing the entirety of the plurality of media sessions, third attribute line information indicating a media attribute value of a first media session among the plurality of media sessions, first media line information describing a media type, a port number, protocol, and a media format of the first media session related to the third attribute line information, and at least one piece of fourth attribute line information including media parameters of the first media session related to the first media line information.

In an embodiment, the first attribute line information may indicate that the media data of the volumetric video is transmitted through the plurality of media sessions having media attribute values of atlas information, occupancy video data, geometry video data, and at least one piece of attribute video data, respectively.

In an embodiment, the second attribute line information may include at least one of a group of codec parameters used in substreams carried through the plurality of media sessions, information on a bandwidth of the entirety of grouped media sessions, a limited number (for example, the maximum number) of points included in the compressed three-dimensional (3D) model, or specified attributes.

In an embodiment, the first attribute line information may indicate that the media data of the volumetric video is produced using the volumetric video compression scheme identified as SD (scene description) and is transmitted through the plurality of media sessions having media attribute values of SD and M1, respectively, and the second attribute line information may include at least one media parameter specific to an SD format.

In an embodiment, at least one of the first or second messages may be an SDP offer message, an SDP answer message, an RTCP feedback message, or a command of HTTP restful API.

An apparatus for transmitting a volumetric video for a volumetric video communication service in a mobile communication system according to an embodiment may include a transceiver and a controller functionally connected to the transceiver, wherein the controller may be configured to determine a volumetric video compression scheme for the volumetric video, transmit a first message including first media parameters for the determined volumetric video compression scheme to a peer device, receive a second message including second media parameters from the p7eer device in response to the transmission of the first message, and transmit a volumetric video compressed according to the second media parameters to the peer device.

An apparatus for receiving a volumetric video for a volumetric video communication service in a mobile communication system according to an embodiment may include a transceiver and a controller functionally connected to the transceiver, wherein the controller may be configured to receive a first message including first media parameters for a video compression scheme of the volumetric video from the peer device, transmit a second message including second media parameters to the peer device in response to the reception of the first message, and receive a volumetric video compressed according to the second media parameters from the peer device.

The electronic device performing, managing, and implementing various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method comprising:
   determining a volumetric video compression scheme for a volumetric video to be transmitted for a volumetric video communication service in a mobile communication system;
   transmitting a first message comprising first media parameters for the determined volumetric video compression scheme to a peer device;
   receiving a second message comprising second media parameters from the peer device in response to the transmission of the first message; and
   transmitting a compressed volumetric video that is compressed according to the second media parameters to the peer device,
   wherein at least one of the first or second messages comprises:
      first attribute line information indicating that media data of the volumetric video is produced using the volumetric video compression scheme and is transmitted through a plurality of media sessions;
      second attribute line information comprising media parameters describing an entirety of the plurality of media sessions;
      third attribute line information indicating a media attribute value of a first media session among the plurality of media sessions;
      first media line information describing a media type, a port number, protocol, and a media format of the first media session related to the third attribute line information; and
      at least one piece of fourth attribute line information comprising media parameters of the first media session related to the first media line information.

2. The method of claim 1, wherein the first attribute line information indicates that the media data of the volumetric video is transmitted through the plurality of media sessions including media attribute values of atlas information, occupancy video data, geometry video data, and at least one piece of attribute video data, respectively.

3. The method of claim 1, wherein the second attribute line information comprises at least one of: a group of codec parameters used in substreams carried through the plurality of media sessions; information on a bandwidth of an entirety of grouped media sessions; a limited number of points included in a compressed three-dimensional (3D) media; or specified attributes.

4. The method of claim 1, wherein the first attribute line information indicates that the media data of the volumetric video is produced using the volumetric video compression scheme identified as scene description (SD) and is transmitted through the plurality of media sessions including media attribute values of SD and M1, respectively; and
   wherein the second attribute line information comprises at least one media parameter specific to an SD format.

5. The method of claim 1, wherein at least one of the first or second messages is a session description protocol (SDP) offer message, an SDP answer message, a real-time transport control protocol (RTCP) feedback message, or a command of hypertext transfer protocol (HTTP) restful application program interface (API).

6. A method comprising:
   receiving a first message comprising first media parameters for a volumetric video compression scheme of a volumetric video for a volumetric video communication service in a mobile communication system from a peer device;
   transmitting a second message comprising second media parameters to the peer device in response to the reception of the first message; and
   receiving a compressed volumetric video that is compressed according to the second media parameters from the peer device;
   wherein at least one of the first or second messages comprises:
      first attribute line information indicating that media data of the volumetric video is produced using the volumetric video compression scheme and is transmitted through a plurality of media sessions;
      second attribute line information comprising media parameters describing an entirety of the plurality of media sessions;
      third attribute line information indicating a media attribute value of a first media session among the plurality of media sessions;
      first media line information describing a media type, a port number, protocol, and a media format of the first media session related to the third attribute line information; and
      at least one piece of fourth attribute line information comprising media parameters of the first media session related to the first media line information.

7. The method of claim 6, wherein the first attribute line information indicates that the media data of the volumetric video is transmitted through the plurality of media sessions including media attribute values of atlas information, occupancy video data, geometry video data, and at least one piece of attribute video data, respectively.

8. The method of claim 6, wherein the second attribute line information comprises at least one of: a group of codec parameters used in substreams carried through the plurality of media sessions; information on a bandwidth of an entirety of grouped media sessions; a limited number of points included in a compressed three-dimensional (3D) media; or specified attributes.

9. The method of claim 6, wherein the first attribute line information indicates that the media data of the volumetric video is produced using the volumetric video compression scheme identified as scene description (SD) and is transmitted through the plurality of media sessions including media attribute values of SD and M1, respectively; and wherein the second attribute line information comprises at least one media parameter specific to an SD format.

10. The method of claim 6, wherein at least one of the first or second messages is a session description protocol (SDP) offer message, an SDP answer message, a real-time transport control protocol (RTCP) feedback message, or a command of hypertext transfer protocol (HTTP) restful application program interface (API).

11. An apparatus comprising:
a transceiver; and
a controller coupled with the transceiver,
wherein the controller is configured to:
determine a volumetric video compression scheme for a volumetric video to be transmitted for a volumetric video communication service in a mobile communication system;
transmit a first message comprising first media parameters for the determined volumetric video compression scheme to a peer device;
receive a second message comprising second media parameters from the peer device in response to the transmission of the first message; and
transmit a compressed volumetric video that is compressed according to the second media parameters to the peer device,
wherein at least one of the first or second messages comprises:
first attribute line information indicating that media data of the volumetric video is produced using the volumetric video compression scheme and is transmitted through a plurality of media sessions;
second attribute line information comprising media parameters describing an entirety of the plurality of media sessions;
third attribute line information indicating a media attribute value of a first media session among the plurality of media sessions;
first media line information describing a media type, a port number, protocol, and a media format of the first media session related to the third attribute line information; and
at least one piece of fourth attribute line information comprising media parameters of the first media session related to the first media line information.

12. The apparatus of claim 11, wherein the first attribute line information indicates that the media data of the volumetric video is transmitted through the plurality of media sessions including media attribute values of atlas information, occupancy video data, geometry video data, and at least one piece of attribute video data, respectively.

13. The apparatus of claim 11, wherein the second attribute line information comprises at least one of: a group of codec parameters used in substreams carried through the plurality of media sessions; information on a bandwidth of an entirety of grouped media sessions; a limited number of points included in a compressed three-dimensional (3D) media; or specified attributes.

14. An apparatus comprising:
a transceiver; and
a controller coupled with the transceiver,
wherein the controller is configured to receive a first message comprising first media parameters for a volumetric video compression scheme of a volumetric video for a volumetric video communication service in a mobile communication system from a peer device, transmit a second message comprising second media parameters to the peer device in response to the reception of the first message, and receive a compressed volumetric video that is compressed according to the second media parameters from the peer device, and
wherein at least one of the first or second messages comprises:
first attribute line information indicating that media data of the volumetric video is produced using the volumetric video compression scheme and is transmitted through a plurality of media sessions;
second attribute line information comprising media parameters describing an entirety of the plurality of media sessions;
third attribute line information indicating a media attribute value of a first media session among the plurality of media sessions;
first media line information describing a media type, a port number, protocol, and a media format of the first media session related to the third attribute line information; and
at least one piece of fourth attribute line information comprising media parameters of the first media session related to the first media line information.

15. The apparatus of claim 14, wherein the first attribute line information indicates that the media data of the volumetric video is transmitted through the plurality of media sessions including media attribute values of atlas information, occupancy video data, geometry video data, and at least one piece of attribute video data, respectively.

16. The apparatus of claim 14, wherein the second attribute line information comprises at least one of: a group of codec parameters used in substreams carried through the plurality of media sessions; information on a bandwidth of an entirety of grouped media sessions; a limited number of points included in a compressed three-dimensional (3D) media; or specified attributes.

* * * * *